US012768331B2

(12) United States Patent
Drachmann Haag et al.

(10) Patent No.: US 12,768,331 B2
(45) Date of Patent: Oct. 20, 2026

(54) PROCESS FOR PRODUCING A POLYMER LEADING EDGE PROTECTION SHEET WITH CHAMFERED SIDE EDGES

(71) Applicant: POLYTECH A/S, Bramming (DK)

(72) Inventors: Michael Drachmann Haag, Esbjerg (DK); Frank Sørensen, Aarhus (DK); Jonas Rix Langebaek, Kolding (DK)

(73) Assignee: POLYTECH A/S, Bramming (DK)

( * ) Notice: Subject to any disclaimer, the term of this patent is extended or adjusted under 35 U.S.C. 154(b) by 0 days.

(21) Appl. No.: 19/146,039

(22) PCT Filed: Jan. 5, 2024

(86) PCT No.: PCT/EP2024/050191
§ 371 (c)(1),
(2) Date: Jul. 7, 2025

(87) PCT Pub. No.: WO2024/165245
PCT Pub. Date: Aug. 15, 2024

(65) Prior Publication Data

US 2026/0218677 A1 Jul. 30, 2026

(30) Foreign Application Priority Data

Feb. 8, 2023 (EP) .................................... 23155576

(51) Int. Cl.
*F03D 1/06* (2006.01)
*B29B 13/06* (2006.01)
(Continued)

(52) U.S. Cl.
CPC .......... *F03D 1/0688* (2023.08); *B29B 13/065* (2013.01); *B29C 43/24* (2013.01);
(Continued)

(58) Field of Classification Search
CPC ............. F03D 1/0688; B29L 2031/085; F05B 2240/303; B29C 43/24; B29C 48/0011; B29C 48/07; B29B 13/065; B29K 2075/00; B29K 2105/0032; B29K 2105/0044; B29K 2995/007; B29K 2995/0097
See application file for complete search history.

(56) References Cited

U.S. PATENT DOCUMENTS 10,240,578 B2 3/2019 Behmer et al.
11,578,694 B2 2/2023 Nielsen
(Continued)

FOREIGN PATENT DOCUMENTS

CN 1721167 A 1/2006
CN 102325646 A 1/2012
(Continued)

OTHER PUBLICATIONS

International Search Report and Written Opinion dated Apr. 26, 2024 (10 pages) from PCT Priority Application PCT/EP2024/050191 filed Jan. 5, 2024.
(Continued)

*Primary Examiner* — Eldon T Brockman
(74) *Attorney, Agent, or Firm* — Crowell & Moring LLP

(57) ABSTRACT

A process for producing a polymer leading edge protection sheet with chamfered side edges for a wind turbine blade.

31 Claims, 8 Drawing Sheets

(51) Int. Cl.

| | |
|---|---|
| ***B29C 43/24*** | (2006.01) |
| ***B29C 48/00*** | (2019.01) |
| ***B29C 48/07*** | (2019.01) |
| *B29K 75/00* | (2006.01) |
| *B29K 105/00* | (2006.01) |
| *B29L 31/08* | (2006.01) |

(52) U.S. Cl.

CPC .......... *B29C 48/0011* (2019.02); *B29C 48/07* (2019.02); *B29K 2075/00* (2013.01); *B29K 2105/0032* (2013.01); *B29K 2105/0044* (2013.01); *B29K 2995/007* (2013.01); *B29K 2995/0097* (2013.01); *B29L 2031/085* (2013.01); *F05B 2240/303* (2020.08)

(56) References Cited

U.S. PATENT DOCUMENTS

| | | | |
|---|---|---|---|
| 11,597,183 B2 | 3/2023 | Free et al. | |
| 2006/0005925 A1 | 1/2006 | Hase et al. | |
| 2006/0087059 A1 | 4/2006 | Boissonnat et al. | |
| 2012/0039720 A1 | 2/2012 | Bech | |
| 2013/0126543 A1 | 5/2013 | Bohrer et al. | |
| 2014/0170369 A1 | 6/2014 | Bech | |
| 2016/0215757 A1 | 7/2016 | Behmer et al. | |
| 2020/0189164 A1* | 6/2020 | Free | B29C 48/08 |
| 2021/0310459 A1 | 10/2021 | Nielsen | |
| 2024/0263611 A1 | 8/2024 | Rokohl et al. | |

FOREIGN PATENT DOCUMENTS

| | | |
|---|---|---|
| CN | 110603130 A | 12/2019 |
| EP | 3 865 703 A1 | 8/2021 |
| EP | 4 102 053 A1 | 12/2022 |
| WO | WO 2015/015202 A1 | 2/2015 |
| WO | WO 2018/203260 A1 | 11/2018 |

OTHER PUBLICATIONS

Extended European Search Report dated Jul. 17, 2023 (5 pages) out of European priority application 23155576.4 filed Feb. 8, 2023.

Chinese-language Office Action issued in Chinese Application No. 202480006797.8 dated Jul. 11, 2026 (7 pages).

* cited by examiner

PROCESS FOR PRODUCING A POLYMER LEADING EDGE PROTECTION SHEET WITH CHAMFERED SIDE EDGES

This application is a National Stage application of International Application No. PCT/EP2024/050191, filed Jan. 5, 2024, the entire contents of which are incorporated herein by reference.

This application claims priority under 35 U.S.C. § 119(a) to European Patent Application No. 23155576.4, filed on Feb. 8, 2023, the entire contents of which are incorporated herein by reference.

BACKGROUND OF THE INVENTION

Technical Field

The invention relates to a process for producing a polymer leading edge protection sheet with chamfered side edges for a wind turbine blade.

Background Information

Rotor blades in e.g. wind turbines, helicopters, and the like, are subject to varied environmental conditions, including erosion caused by the impact of airborne material, such as rain, sand, dust, and other debris. The leading edge of a wind turbine blade is particularly prone to damage by erosion. As rotor blades get longer, the tip speed of the blades becomes higher, and with wind turbines being erected in ever-tougher and increasingly remote locations—including offshore sites—this only makes leading edge erosion more of a problem.

The industry has sought ways of protecting against such erosion by means of films and coatings, among others. In some examples, pre-cast sections made of robust yet soft and flexible polymer shells are applied to the leading edge of a wind turbine blade. The shell is designed and dimensioned to absorb the kinetic energy from rain, hail, and airborne particles. As such, the shell provides optimal protection for the rigid fiberglass surface of the blade.

In some examples, a film is applied to the leading edge of a wind turbine blade, where the film is applied around the leading edge of the wind turbine blade and adhered to the blade by an adhesive. The outermost surface of commercial tapes is usually planar and, in its most basic configuration, comprises a polymer film as protective layer and an adhesive layer for attachment to the wind turbine blade. Some films have an overall profile of an outer top surface of the film, which is convex-curved or convex-trapezoidal.

Creating the outer top surface normally involves shaping the surface using cutters after production. This however results in an outer surface on the film, which is uneven.

There is therefore a need for an improved process for producing a polymer leading edge protection sheet for a wind turbine blade providing it with an improved smoothness on the outer surface.

SUMMARY

Disclosed herein in a first aspect is a process for producing a polymer leading edge protection sheet with chamfered side edges for a wind turbine blade. By wind turbine is meant wind turbines of a wide range of sizes.

The process includes the steps of:

- providing a polymer material sheet including a first major surface and a second major surface, each major surface having a width extending in a width direction between side edges of the polymer material sheet, wherein the first and second major surfaces are oppositely directed, wherein the polymer material sheet has a thickness, and
- shaping the polymer material sheet into a polymer leading edge protection sheet by providing the polymer material sheet between at least one pair of rollers.

The at least one pair of rollers includes a first roller and a second roller, wherein:

- the first roller includes a first shaping surface extending between opposing ends of the first roller, wherein the first shaping surface extends concavely between the opposing ends;
- the second roller includes a second shaping surface extending between opposing ends of the second roller;
- the first and second shaping surfaces are arranged opposite each other; and
- the thickness of the polymer material sheet is altered by means of the shaping surfaces of the rollers during rotation of the first and second rollers to obtain the polymer leading edge protection sheet with chamfered side edges, the polymer leading edge protection sheet having a reduced thickness at the side edges when compared to the sheet thickness at a center area.

By the first shaping surface extending concavely is meant that at least a part of the middle section of the first roller has a smaller diameter than the end sections of the first roller. The roller may have a continuous decrease in diameter if measuring from the side edges towards the centre of the roller. Alternatively, it may have a continuous decrease in diameter if measuring from the side edges towards a middle section spanning over a certain width of the roller, such as e.g. a middle section spanning over 10% of the roller width.

By using the at least one pair of rollers for altering and shaping the polymer leading edge protection sheet, it is possible to obtain a polymer leading edge protection sheet with a specific surface profile by choosing the roller shaping surface to match the requirements.

This provides a much smoother surface profile on the polymer leading edge protection sheet as compared to processes where a polymer leading edge protection sheet with the same thickness is shaped into a polymer leading edge protection sheet having chamfered edges by removing part of the polymer leading edge protection sheet after production. The use of the rollers ensure that the polymer leading edge protection sheet obtains exactly the surface profile shape desired as the polymer leading edge protection sheet may be allowed to cool down during the process of providing the polymer material sheet between the at least one pair of rollers. Further, by the above process is obtained an improved process for producing a polymer leading edge protection sheet with an improved smoothness on the outer surface due to the use of the at least one pair of rollers.

The concavely extending first shaping surface may be curved. Thus, in one or more examples, the first shaping surface of the first roller is curved. By curved is meant that the surface is a deviation from a straight line or plane surface without sharp breaks or angularity.

Disclosed herein in a second aspect is a polymer leading edge protection sheet obtained according to the process above.

Disclosed herein in a third aspect is a wind turbine blade with a polymer leading edge protection sheet according to the above.

The providing of a polymer material sheet may be obtained in a number of ways. One way is to melt a granulate material and shape it into the material sheet. Thus, in one or more examples, the process further includes:

melting a granulated polymer material through an extruder process to obtain a molten polymer material having a predefined hardness hereby obtaining a plasticized polymer material; and pressing the plasticized polymer material through a flat die to form the plasticized polymer material into the polymer material sheet.

After pressing the plasticised polymer material through a flat die, the plasticised polymer material may be pulled through the rollers to form the plasticised polymer material into the polymer material sheet.

In the extruder process, the granulated polymer material (such as a thermoplastic polyurethane material) may be softened and melted by friction heat created using a screw or screw shaft compressing the material by rotation in the extruders cylinder. During the extruder process, the granulated polymer material is heated and the obtained plasticised polymer material is obtained at an elevated temperature. The plasticised polymer material may be maintained at the elevated temperature in the flat die by one or more electric heating zones, which ensures that the plasticised polymer material is maintained at a mouldable/plasticised state.

Prior to melting the granulated polymer material, the granulated polymer material may be dried to reduce or remove any moisture. Thus, in one or more examples, the process further includes providing a granulated polymer material and drying the granulated polymer material to a moisture level at or below 0.02 wt % prior to melting the granulated polymer material. The drying may, e.g., be performed by air drying in an desiccant air drier.

In one or more examples, the polymer material is a polyurethane material. The polyurethane material may be a polyurethane thermoplastic material. Thus, in one or more examples, the polymer leading edge protection sheet is a polyurethane leading edge protection sheet. The polyurethane thermoplastic material may include a polyol, a chain extender and an aliphatic isocyanate. The polyurethane leading edge protection sheet may be a thermoplastic polyurethane leading edge protection sheet. Polyurethane may be a commonly used polymer material as the main material in the polymer leading edge protection sheet. However, alternative polymer materials may also be used, including thermoplastic olefins, styrene block copolymers, thermoplastic copolyesters, silicone thermoplastics, silicone polyoxamide, aliphatic polyether-based thermoplastic polyurethane, copolyester ether, crosslinked polyurethanes, polyureas, low density polyethylene (LDPE), linear low density polyethylene (LLDPE), styrene-butadiene-styrene block copolymer (SBS), styrene-ethylene butylene-styrene block copolymer (SEBS), and styrene-ethylene/propylene-styrene (SEPS) block copolymer. Combinations of any of the polymer materials may also be envisioned.

In one or more examples, the polymer material is a polyurethane material and the granulated polyurethane material is an aliphatic thermoplastic polyurethane (TPU) made from a polyol, such as di-functional polyol, butanediol chain extender and an aliphatic isocyanate. By "di-functional polyol" is meant that the thermoplastic polyurethane polymer has two reactive groups per molecule. Normally, the thermoplastic polyurethane is linear. An aliphatic thermoplastic polyurethane (TPU) may be a commonly used granulated polyurethane material. However, alternative granulated polymer materials may also be used, including granulates of thermoplastic olefins, styrene block copolymers, thermoplastic copolyesters, silicone thermoplastics, silicone polyoxamide, aliphatic polyether-based thermoplastic polyurethane, copolyester ether, crosslinked polyurethanes, polyureas, low density polyethylene (LDPE), linear low density polyethylene (LLDPE), styrene-butadiene-styrene block copolymer (SBS), styrene-ethylene butylene-styrene block copolymer (SEBS), and styrene-ethylene/propylene-styrene (SEPS) block copolymer. Combinations of any of the polymer granulate materials may also be envisioned.

In one or more examples, the polymer material is a polyurethane material and the granulated polyurethane material further includes one or more additives, such as UV-absorbers, antioxidants, and/or pigments. The amount of additives may vary from between 0.1-50 wt %. The additives may also include dyes, fillers, stabilizers, or combinations thereof.

In one or more examples, the polymer material is a polyurethane material and the granulated polyurethane material does not include a release agent. A release agent may be omitted in order to ensure that the subsequent bonding to the pressure sensitive adhesive is strong.

In one or more examples, the polymer leading edge protection sheet is characterized by the following physical properties:

a maximum thickness between 0.8 mm and 2.0 mm;

a shore A hardness between 65 and 75, measured by ISO 868;

an elongation above 400 mm when measured at 23° C. using ISO 37/1A;

a speed of sound below 1700 m/s, measured by ISO 16810 and ISO 16811; and an erosion resistance above 8 hours at 150 m/s, measured by DNV-RP-0171.

In one or more examples, the polymer leading edge protection sheet is characterized by the following physical properties:

a maximum thickness between 0.7 mm and 2.0 mm;

a shore A hardness between 68 and 78, measured by ISO 868;

an elongation above 400 mm when measured at 23° C. using ISO 37/1A;

a speed of sound below 1700 m/s, measured by ISO 16810 and ISO 16811; and an erosion resistance above 10 hours at 140 m/s, measured by DNV-RP-0171.

By maximum thickness is meant the maximum thickness over the leading edge protection sheet. The maximum thickness will normally be found at the centre part of the polymer leading edge protection sheet in the width direction. The thickness at the chamfered edges will always be smaller than the maximum thickness of the polymer leading edge protection sheet. The maximum thickness will normally depend on the hardness of the material. Often when the material hardness is between 65 and 78, the maximum thickness should be less than 2 mm, most likely less than 1.5 mm, or even less than 1.2 mm.

In one or more examples, the polymer leading edge protection sheet has a minimum thickness of more than 0.01 mm, such as more than 0.05 mm, such as more than 0.10 mm. By minimum thickness is meant the minimum thickness over the leading edge protection sheet. The minimum thickness will normally be found at the chamfered edges of the polymer leading edge protection sheet. The maximum thickness of the polymer leading edge protection sheet will always be larger than the minimum thickness at the chamfered edges. The minimum thickness will normally depend on the hardness of the material.

In one or more examples, the polymer leading edge protection sheet has a width in a width direction between side edges of the polymer leading edge protection sheet, the width including a first third and a second third, wherein the first and second thirds are located proximate each their respective side edge of the polymer leading edge protection sheet, wherein the remaining third is arranged between the first and second thirds, wherein the polymer leading edge protection sheet thickness variation in the width direction is larger at the first and second thirds than at the remaining third. The polymer leading edge protection sheet thickness variation in the remaining third of the polymer leading edge protection sheet corresponds to the thickness variation in the middle section of the polymer leading edge protection sheet. If the polymer leading edge protection sheet is substantially flat over a larger area around the middle part of the polymer leading edge protection sheet, the thickness variation in the third may be close to zero. If the polymer leading edge protection sheet has a thickness profile, which varies continuously with the thickness profile having a maximum at the middle area of the polymer leading edge protection sheet, the thickness variation in the remaining third will be larger than zero. However, it will normally be smaller than at the first and second third of the polymer leading edge protection sheet.

In one or more examples, the remaining third has a maximum thickness of less than 1.5 mm. Thus, the polymer leading edge protection sheet may be characterized by a maximum thickness between 0.7 mm and 1.5 mm, such as between 0.8 mm and 1.5 mm.

In one or more examples, the remaining third has a maximum thickness of less than 1.2 mm. Thus, the polymer leading edge protection sheet may be characterized by a maximum thickness between 0.7 mm and 1.5 mm, such as between 0.8 mm and 1.2 mm.

In one or more examples, the remaining third has a maximum thickness of less than 1 mm. Thus, the polymer leading edge protection sheet may be characterized by a maximum thickness between 0.7 mm and 1.5 mm, such as between 0.8 mm and 1.0 mm.

In one or more examples, the first third and the second third has a minimum thickness of less than 0.5 mm. Thus, the difference between the thickness of the polymer leading edge protection sheet over the entire width of the sheet may be at least 1.5 mm if the maximum thickness is between 0.7 mm and 1.5 mm, such as between 0.8 mm and 2.0 mm.

In one or more examples, the first third and the second third has a minimum thickness of more than 0.01 mm, such as more than 0.05 mm, such as more than 0.10 mm.

In one or more examples, the polymer leading edge protection sheet has a width in a width direction between side edges of the polymer leading edge protection sheet, the width comprising a first fourth and a second fourth, wherein the first and second fourths are located proximate each their respective side edge of the polymer leading edge protection sheet, wherein the remaining half are arranged between the first and second fourths, wherein the polymer leading edge protection sheet thickness variation in the width direction is larger at said first and second fourths than at the remaining half. The polymer leading edge protection sheet thickness variation in the remaining half of the polymer leading edge protection sheet corresponds to the thickness variation in the middle section of the polymer leading edge protection sheet. If the polymer leading edge protection sheet is substantially flat over a larger area around the middle part of the polymer leading edge protection sheet, the thickness variation in the remaining half may be close to zero. If the polymer leading edge protection sheet has a thickness profile, which varies continuously with the thickness profile having a maximum at the middle area of the polymer leading edge protection sheet, the thickness variation in the remaining half will be larger than zero. However, it will normally be smaller than at the first and second fourth of the polymer leading edge protection sheet.

In one or more examples, the polymer leading edge protection sheet has a shore A hardness at 78 or less. This is measured by ISO 868.

In one or more examples, the polymer leading edge protection sheet has a shore A hardness at 75 or less. This is measured by ISO 868.

In one or more examples, the second shaping surface of the second roller extends cylindrically between the opposing ends. By cylindrically is meant that the second roller has a diameter, which does not vary, or only varies slightly over the length of the roller. Alternatively, the second shaping surface may be slightly convex.

In one or more examples, the first and second rollers each has a longitudinal axis (LA1, LA2) extending between said opposing ends, wherein the longitudinal axes (LA1, LA2) are substantially parallel. The two rollers thus may be positioned opposite each other with an equal distance between the two ends of the rollers. If a polymer leading edge protection sheet where one side edge is thinner than the other side edge is relevant, the distance between the first and second roller may be slightly larger at one end of the rollers than at the other end of the rollers.

In one or more examples, the second shaping surface of the second roller is smooth. The polymer leading edge protection sheet will normally have one flat surface and one curved surface. The first shaping surface of the first roller will normally be in contact with the curved surface of the polymer leading edge protection sheet and the second shaping surface of the second roller will normally be in contact with the flat surface of the polymer leading edge protection sheet when the polymer leading edge protection sheet is provided between the first pair of rollers. After producing the polymer leading edge protection sheet as described above, an additional layer, e.g. an adhesive layer, may be added to the flat surface of the polymer leading edge protection sheet. Having a second shaping surface of the second roller which is smooth provides a smooth flat surface on the polymer leading edge protection sheet. If applying a pressure sensitive adhesive to a leading edge protection sheet on its flat surface side after production, the key is to get the contact area as high as possible, which is best achieved by having a smooth surface with low roughness on the flat surface of the polymer leading edge protection sheet. If there is a high degree of roughness on the second roller, a pressure sensitive adhesive (PSA) applied to the polymer leading edge protection sheet after exiting the rollers might only attach itself to the peaks and there will be no contact with the valleys on the surface of the polymer leading edge protection sheet. This means that the overall contact area between the polymer leading edge protection sheet and PSA is less than 100%.

The extruded leading edge protection sheet may obtain its shape by the hot plasticised thermoplastic material being pushed through the flat die tool. The hot plasticised preshaped sheet may be pulled away from the hot flat die, onto and through the first pair of rollers, cooling and defining the final shape. The pull may be performed by the rotation of the rollers.

Leading the polymer material sheet through and between the first pair of rollers, i.e. between the first roller and the second roller may be achieved by pushing or pulling the polymer material sheet. A combination of both pushing and pulling the sheet in between the rollers in the first pair of rollers may also be used. Thus, in one or more examples, shaping the polymer material sheet into the polymer leading edge protection sheet is obtained by pulling and/or pushing the polymer material sheet through at least the one pair of rollers. The first roller may pull the polymer material sheet through the at least one pair of rollers.

Alternatively, the second roller may be the roller pulling the polymer material sheet through the at least one pair of rollers. Yet alternatively, both rollers in the at least one pair of rollers may be pulling the polymer material sheet through the at least one pair of rollers. Thus, in one or more examples, shaping the polymer material sheet into the polymer leading edge protection sheet is obtained by pulling the polymer material sheet through at least the one pair of rollers, wherein at least the first and/or the second roller pulls the polymer material sheet through at least the one pair of rollers.

In one or more examples, shaping the polymer material sheet into the polymer leading edge protection sheet is obtained by pushing the polymer material sheet through at least the one pair of rollers, wherein at least the flat die/extruder pushes the polymer material sheet through at least the one pair of rollers. The polymer material sheet may be pushed out of the flat die by one or more rotating screws. When the polymer material sheet enters the space between the first pair of rollers, the polymer material sheet may be pulled through the rollers at the same speed as the rotating screw(s) deliver more of the polymer material sheet.

In one or more examples, shaping the polymer material sheet into the polymer leading edge protection sheet is obtained by allowing the polymer material sheet to fall into a cavity between the at least the one pair of rollers. This process is also referred to as using a coat hanger for obtaining the shape of the polymer leading edge protection sheet.

In one or more examples, the process further includes providing the polymer leading edge protection sheet between a second pair of rollers, the second pair of rollers including a third roller, and one of the first roller and the second roller. The polymer leading edge protection sheet is thereby led through first the first pair of rollers and second the second pair of rollers. By the second pair of rollers sharing one of the rollers with the first pair of rollers, the polymer leading edge protection sheet will normally follow this roller as it rotates and thereby be led through the second pair of rollers after exiting the space between the first pair of rollers. The third roller may be similar to the first roller or the second roller in the sense that it has a similar shaping surface. Thus, in an example, the third roller includes a third shaping surface extending between opposing ends of the third roller, wherein the third shaping surface extends concavely between the opposing ends. Alternatively, in an example the third roller includes a third shaping surface extending between opposing ends of the third roller, wherein the third shaping surface extends cylindrically between the opposing ends.

Alternatively, the second pair of rollers may comprise a third and a fourth roller, where none of the third and/or fourth roller is the first and/or second roller.

In one or more examples, the first, second and/or third roller is cooled. By one or more of the rollers being cooled, is obtained that the polymer leading edge protection sheet entering into the first pair of rollers—and possibly subsequently the second pair of rollers—having an elevated temperature allowing it to be shaped into the polymer leading edge protection sheet with chamfered side edges, will be cooled down faster as it passes through the rollers. This may improve the control for obtaining the surface profile shape desired. The cooling may be obtained by using cooled water circulating inside one or more of the rollers. Alternatively, instead of cooled water, a different cooling liquid such as e.g. glycol may be used.

The process may further include providing the polymer leading edge protection sheet through a quality control section, which ensures performance specifications/requirement specifications of the polymer leading edge protection sheet. This is normally performed after exiting the pair(s) of rollers.

The process may further include rolling the polymer leading edge protection sheet onto one or more rolls prior to addition of an adhesive and/or shortening of the polymer leading edge protection sheet.

BRIEF DESCRIPTION OF THE DRAWINGS

Various examples are described hereinafter with reference to the figures. Like reference numerals refer to like elements throughout. Like elements will, thus, not be described in detail with respect to the description of each figure. It should also be noted that the figures are only intended to facilitate the description of the examples. They are not intended as an exhaustive description of the invention or as a limitation on the scope of the invention. In addition, an illustrated example needs not have all the aspects or advantages shown. An aspect or an advantage described in conjunction with a particular example is not necessarily limited to that example and can be practiced in any other examples even if not so illustrated, or if not so explicitly described.

DESCRIPTION OF EMBODIMENTS

Figure 1:
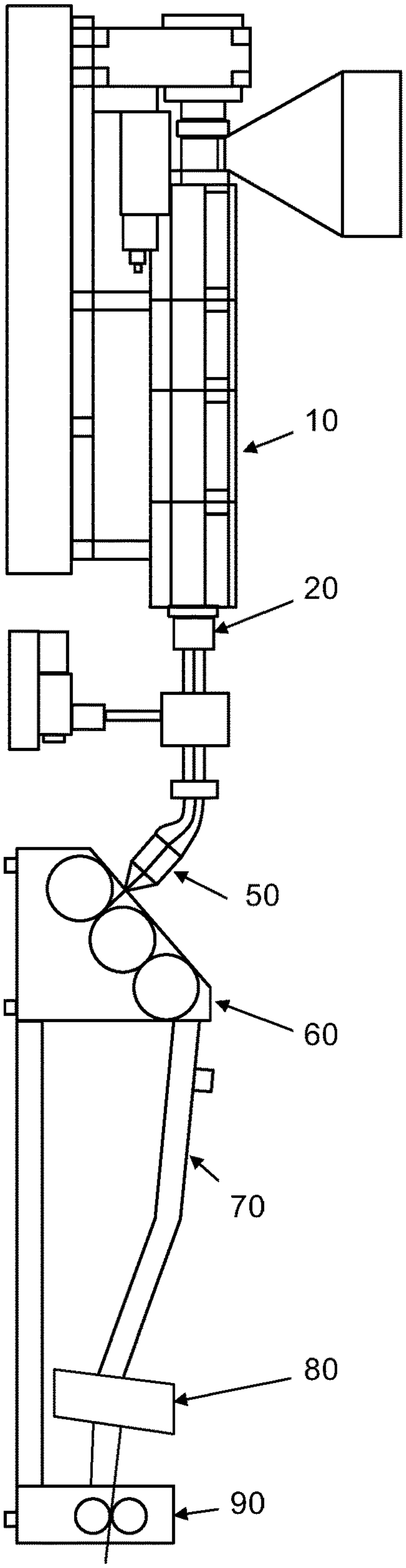
FIG. 1 shows a system for producing a polymer leading edge protection sheet with chamfered side edges.

Exemplary examples will now be described more fully hereinafter with reference to the accompanying drawings. In this regard, the present examples may have different forms and should not be construed as being limited to the descriptions set forth herein. Accordingly, the examples are merely described below, by referring to the figures, to explain aspects. As used herein, the term “and/or” includes any and all combinations of one or more of the associated listed items. Expressions such as “at least one of,” when preceding a list of elements, modify the entire list of elements and do not modify the individual elements of the list.

In the drawings, thicknesses of a plurality of layers and areas are illustrated in an enlarged manner for clarity and ease of description thereof. When a layer, area, element, or plate is referred to as being "on" another layer, area, element, or plate, it may be directly on the other layer, area, element, or plate, or intervening layers, areas, elements, or plates may be present therebetween. Conversely, when a layer, area, element, or plate is referred to as being "directly on" another layer, area, element, or plate, there are no intervening layers, areas, elements, or plates therebetween. Further when a layer, area, element, or plate is referred to as being "below" another layer, area, element, or plate, it may be directly below the other layer, area, element, or plate, or intervening layers, areas, elements, or plates may be present therebetween. Conversely, when a layer, area, element, or plate is referred to as being "directly below" another layer, area, element, or plate, there are no intervening layers, areas, elements, or plates therebetween.

The spatially relative terms "lower" or "bottom" and "upper" or "top", "below", "beneath", "less", "above", and the like, may be used herein for ease of description to describe the relationship between one element or component and another element or component as illustrated in the drawings. It will be understood that the spatially relative terms are intended to encompass different orientations of the device in use or operation, in addition to the orientation depicted in the drawings. For example, in the case where a device illustrated in the drawings is turned over, elements described as being on the "lower" side of other elements, or "below" or "beneath" another element would then be oriented on "upper" sides of the other elements, or "above" another element. Accordingly, the illustrative term "below" or "beneath" may include both the "lower" and "upper" orientation positions, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below, and thus the spatially relative terms may be interpreted differently depending on the orientations described.

Throughout the specification, when an element is referred to as being "connected" to another element, the element is "directly connected" to the other element, or "electrically connected" to the other element with one or more intervening elements interposed therebetween.

The terminology used herein is for the purpose of describing particular examples only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined in the present specification.

Exemplary examples are described herein with reference to cross section illustrations that are schematic illustrations of idealized examples, wherein like reference numerals refer to like elements throughout the specification. As such, variations from the shapes of the illustrations as a result, for example, of manufacturing techniques and/or tolerances, are to be expected. Thus, examples described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims. Some of the parts which are not associated with the description may not be provided in order to specifically describe exemplary examples of the present disclosure.

Figure 2:
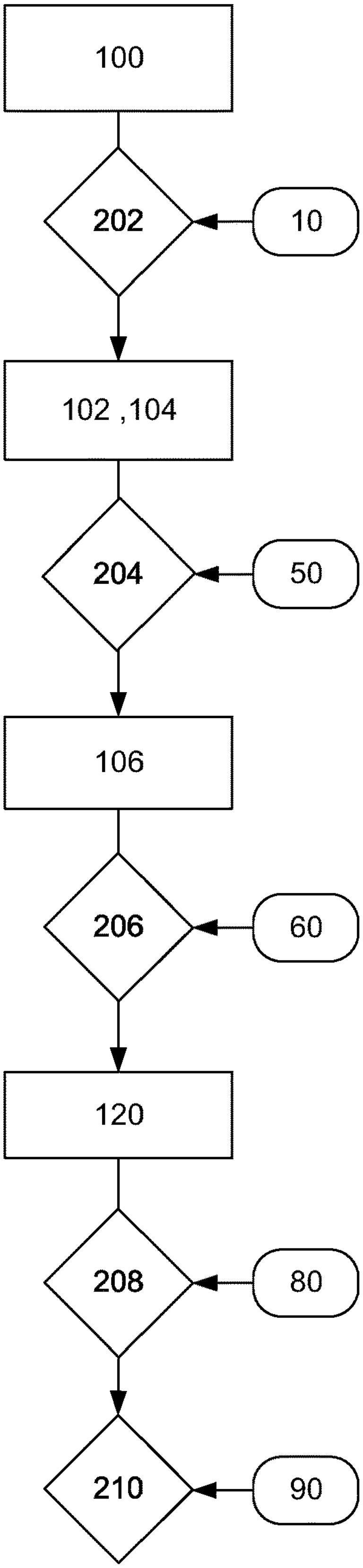
FIG. 2 shows schematically a process for producing a polymer leading edge protection sheet with chamfered side edges.

FIG. 1 shows a system for producing a polymer leading edge protection sheet 120 with chamfered side edges 122 and FIG. 2 shows schematically a process for producing a polymer leading edge protection sheet using the system of FIG. 1. The system shown in FIG. 1 includes an extrusion system 10, a screen system 20, a flat die 50, a roller system 60, a conveyer 70, a quality control section 80, and a pull roll unit 90.

When producing a polymer leading edge protection sheet 120, a polymer material sheet 106 is provided and shaped 206 into a polymer leading edge protection sheet 120 by providing the polymer material sheet 106 between at least one pair of rollers in the roller system 60.

The polymer material sheet 106 may be obtained in a number of different manners, e.g. as shown in FIGS. 1 and 2 by melting 202 a granulated polymer material 100 in an extruder process in the extrusion system 10 to obtain a molten polymer material 102 having a predefined hardness hereby obtaining a plasticised polymer material 104, and subsequently pressing 204 the plasticised polymer material 104 through a flat die 50 to form the plasticised polymer material 104 into the polymer material sheet 106. In the extruder process, the granulated polymer material 100 may be softened and melted by friction heat created using a worm or worm shafts compression and rotation in the extruders cylinder. The granulated polymer material may be dried, e.g. by air drying in an air drier, to a moisture level at or below 0.02 wt % prior to melting 202 the granulated polymer material 100.

Figure 3:
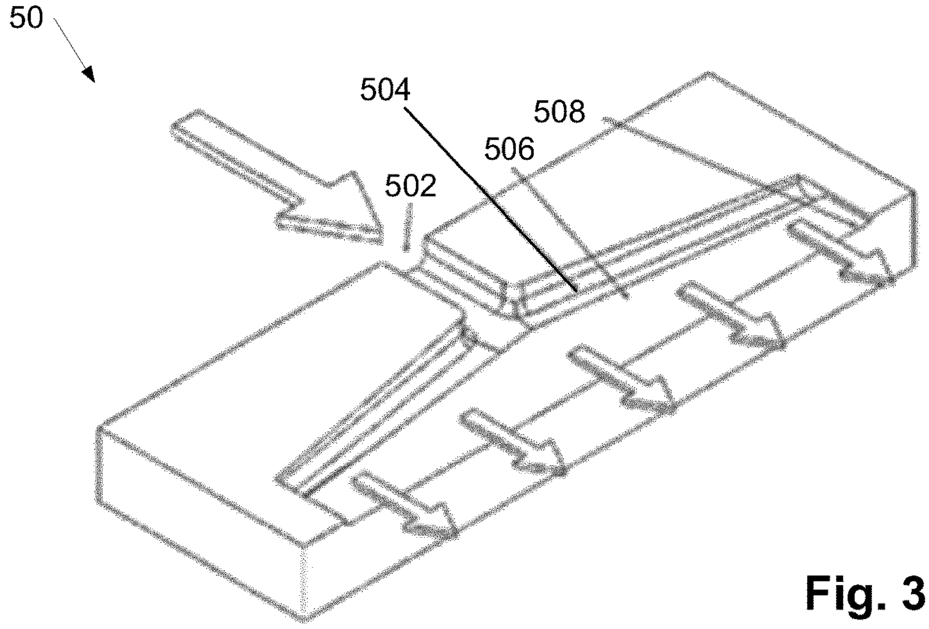
FIG. 3 shows a flat die in a perspective view.

Shaping the polymer material sheet 106 into the polymer leading edge protection sheet 120 may be obtained by pulling and/or pushing the polymer material sheet 106 through at least one pair of rollers 610, 620 as shown in FIG. 3. When pulling the polymer material sheet 106 through at least the one pair of rollers 610, 620 at least the first and/or the second roller 610, 620 pulls the polymer material sheet 106 through at least the one pair of rollers 610, 620.

After obtaining the polymer leading edge protection sheet 120, it may be led via the conveyer 70 through 208 a quality control section 80, which ensures performance specifications/requirement specifications of the polymer leading edge protection sheet 120. The polymer leading edge protection sheet 120 may afterwards be rolled 210 onto one or more rolls 90 prior to addition of an adhesive and/or shortening of the polymer leading edge protection sheet 120. The polymer leading edge protection sheet 120 may be cut into smaller pieces.

Figure 4A:
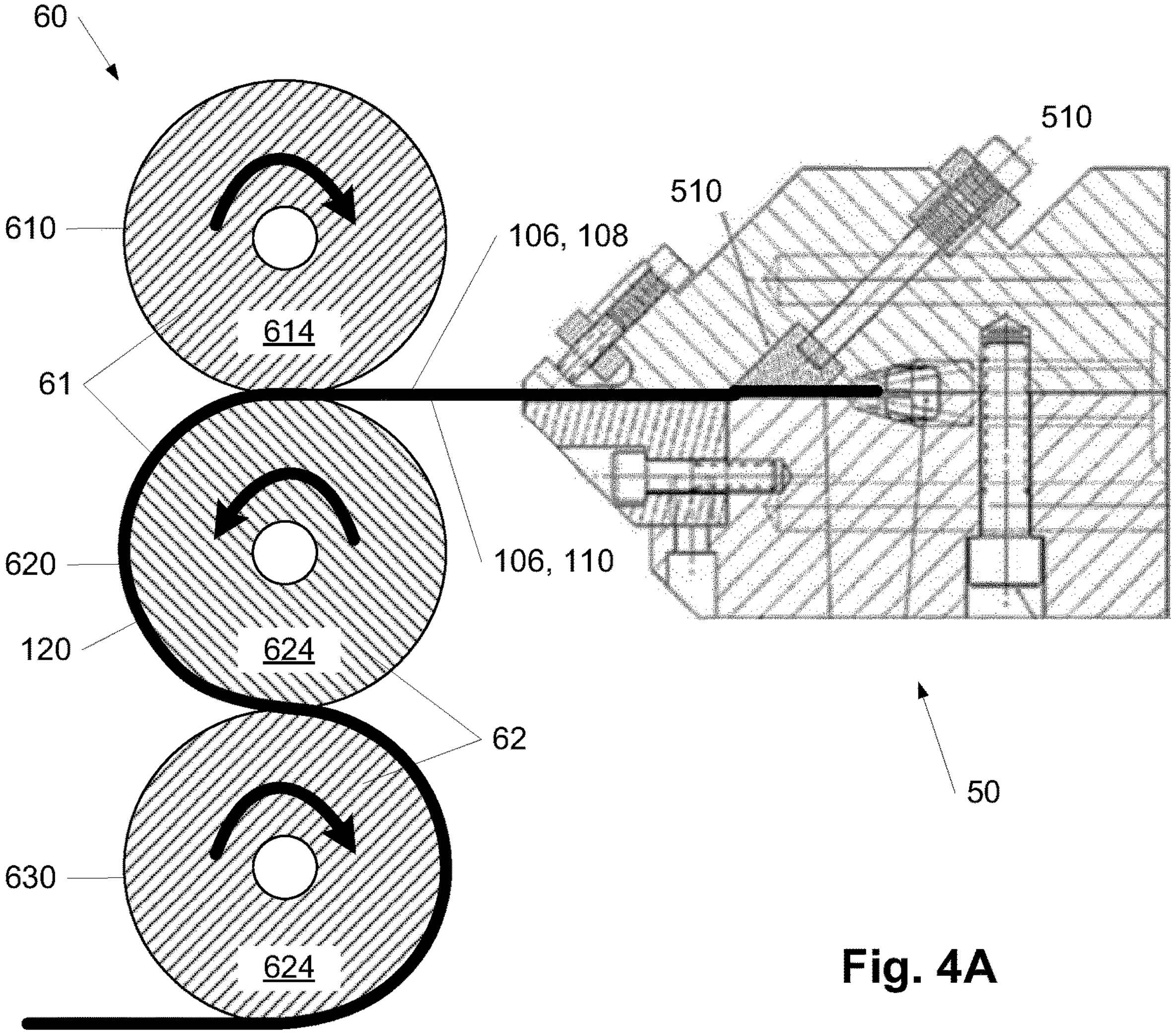
FIG. 4A-C show different systems comprising a flat die and a roller system in a side view.
Figure 4B:
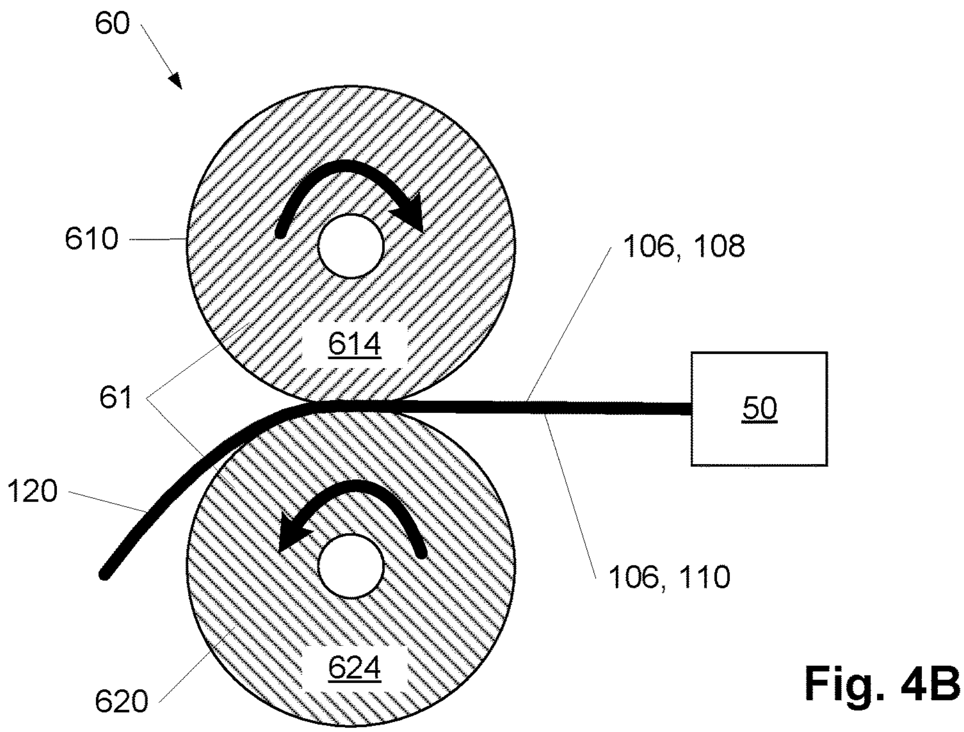
Figure 4C:
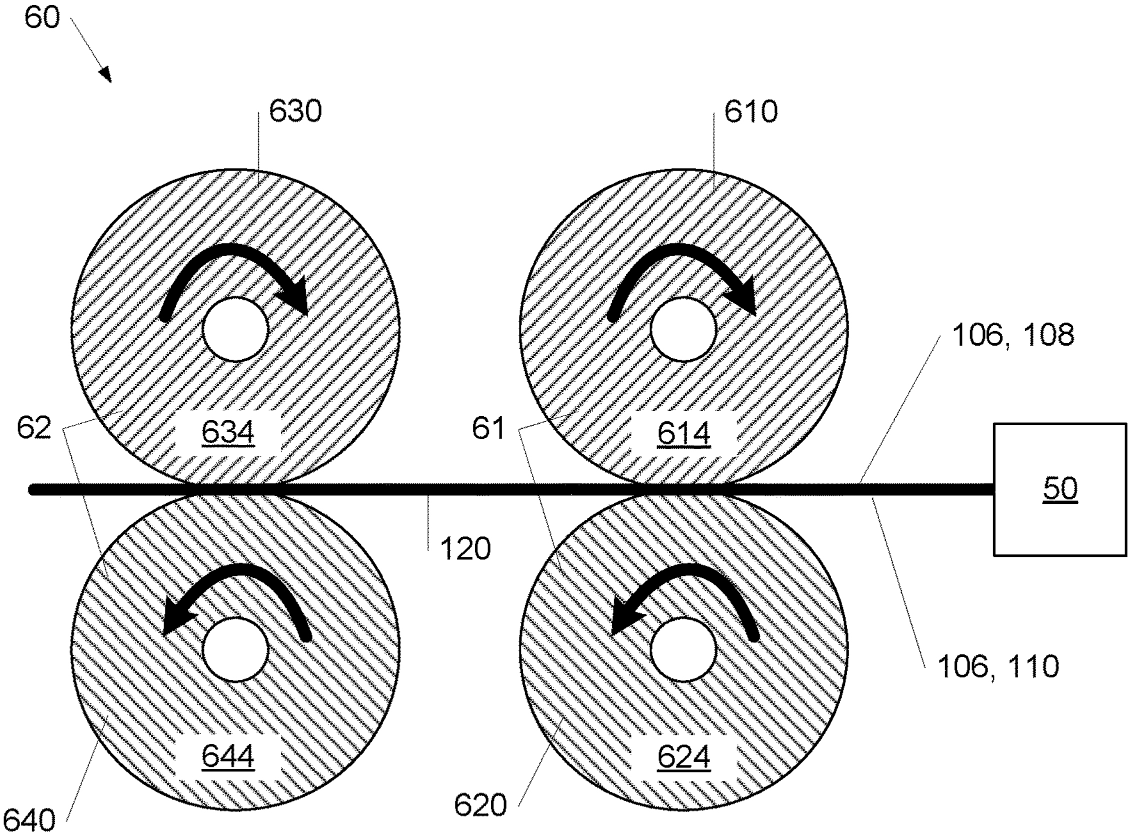

FIG. 3 shows part of the flat die 50 in a perspective view. In FIGS. 4A-C, the flat die is shown together with three different roller systems 60 in a side view. The flat die 50 comprises an inlet channel 502 through which the plasticised polymer material 104 is led onto a flat outlet channel 506 via side surfaces 504. The polymer material sheet 106 exits the flat die 50 at the exiting edge 508 of the flat outlet channel. The plasticised polymer material 104 is maintained at an elevated temperature in the flat die 50 by electric heating zones 510, which ensures that the plasticized material maintains a mouldable/plasticised state.

The roller system 60 shown in FIG. 4A includes a number of rollers 610, 620, 630 arranged in pairs of rollers. The pairs of rollers include a first pair of rollers 61 including a first roller 610 and a second roller 620 are arranged such that the polymer material sheet 106 exiting the flat die 50 is passing between these rollers first before passing between a second pair of rollers 62. Normally, the warm polymer material sheet 106 exiting the flat die 50 is cooled down when coming in contact with the rollers if these are cooled. The second pair of rollers 62 includes the second roller 620 and a third roller 630. The first roller 610 and the third roller 630 rotate in the same direction, whereas the second roller 620 rotate in a direction opposite that of the first and third rollers 610, 630. A first major surface 108 of the polymer material sheet 106 will be in contact with the first roller 610 and a second major surface 110 in contact with the second roller 620. The surfaces of the first and second rollers 610, 620 normally define the shape of the polymer leading edge protection sheet 120 exiting the space between the two rollers 610, 620.

As compared to the roller system 60 shown in FIG. 4A, the roller system 60 shown in FIG. 4B includes one roller less in that only one roller pair 61 including the first roller 610 and the second roller 620 is present. Compared to the roller system 60 in FIG. 4B, the roller system 60 in FIG. 4C comprises two roller pairs 61, 62. The first pair of rollers 61 including the first roller 610 and the second roller 620 arranged such that the polymer material sheet 106 exiting the flat die 50 is passing between these rollers first before passing between the second pair of rollers 62. The second pair of rollers 62 includes the third roller 630 and a fourth roller 640. The first roller 610 and the third roller 630 rotate in the same direction, whereas the second roller 620 and the fourth roller 640 rotate in a direction opposite that of the first and third rollers 610, 630. The two pair of rollers 61, 62 are arranged in parallel. Thus, compared to the roller system 60 of FIG. 4A, the same roller is not shared between the two pair of rollers 61, 62.

The rollers 610, 620, 630, 640 shown in FIG. 4A-C are shown as seen from one of the ends 614, 624, 634, 644 between which each roller 610, 620, 630, 640 extends.

Figure 5A:
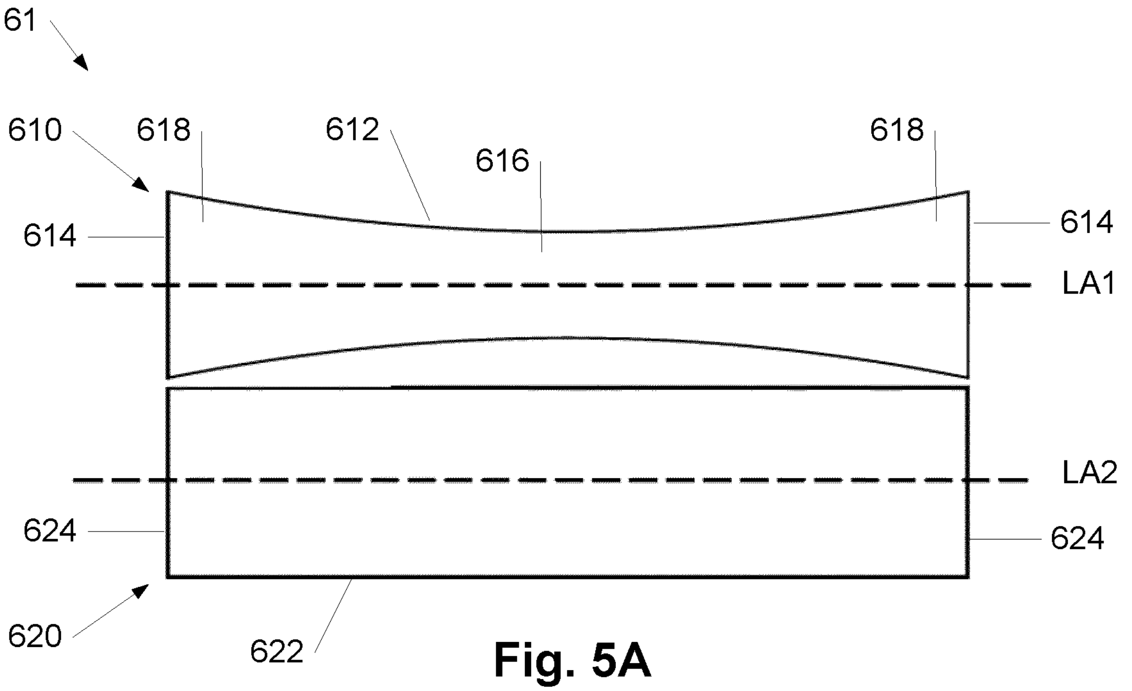
FIGS. 5A-B show a first pair of rollers with and without a leading edge protection between the rollers.

FIG. 5A shows a first pair of rollers 61 including the first roller 610 and the second roller 620. The first roller 610 includes a first shaping surface 612 extending concavely between opposing ends 614 of the first roller 610. By the first roller 610 being concave is meant that the middle section 616 of the first roller 610 has a smaller diameter than the end sections 618 of the first roller 610. This can also be seen on the figure, where the concave shape is clearly observed. The first shaping surface 612 may be curved as shown in the figure, where by curved is meant that the surface is a deviation from a straight line or plane surface without sharp breaks or angularity. The length of the first roller 610 is shown as a first length LA1 extending through the middle of the first roller 610.

The second roller 620 comprises a second shaping surface 622 extending between opposing ends 624 of the second roller 620. The second shaping surface 622 will normally extend between the opposing ends 624 cylindrically. By cylindrically is meant that the second roller 620 has a diameter, which does not vary- or only vary slightly-along a second length LA2 of the second roller 620. Alternatively, the second shaping surface 622 may be slightly convex.

Figure 5B:
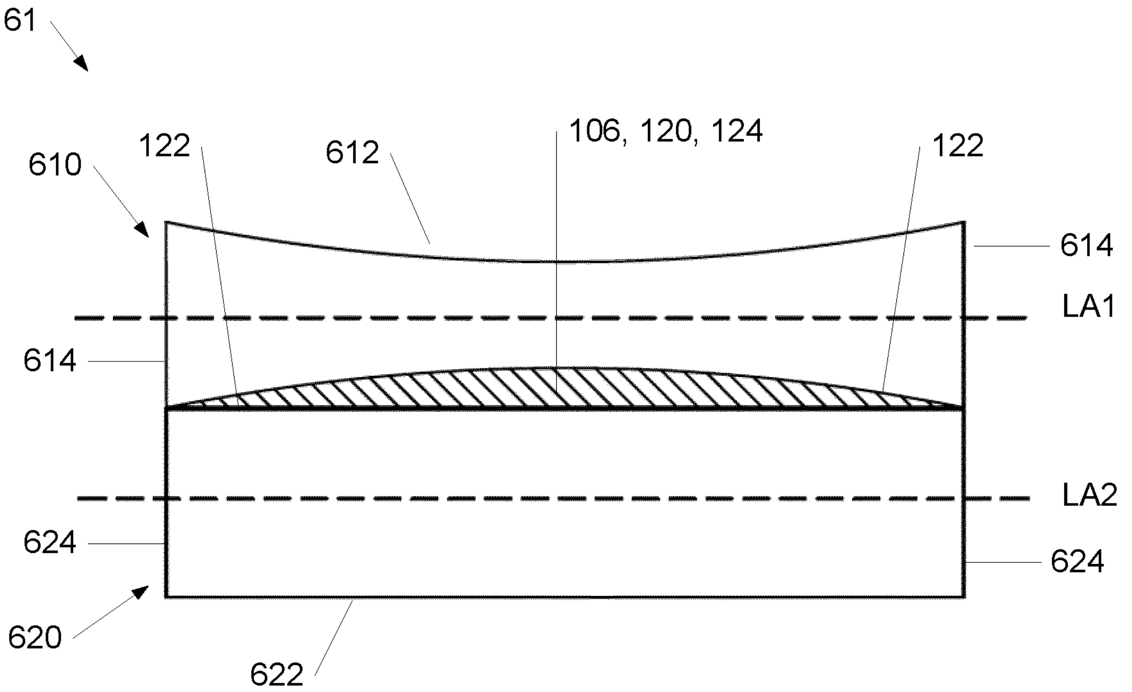

As shown in FIG. 5A, the first and second shaping surfaces 612, 622 are arranged opposite each other. The polymer material sheet 106 is passing through the space between the first and second shaping surfaces 612, 622 as shown in FIG. 5B to obtain the polymer leading edge protection sheet 120 with chamfered side edges 122 defined by the first shaping surface 612 extending concavely between opposing ends 614 of the first roller 610. This gives the polymer leading edge protection sheet 120 a reduced thickness at side edges 122 when compared to the sheet thickness at a centre area 124.

Figure 6A:
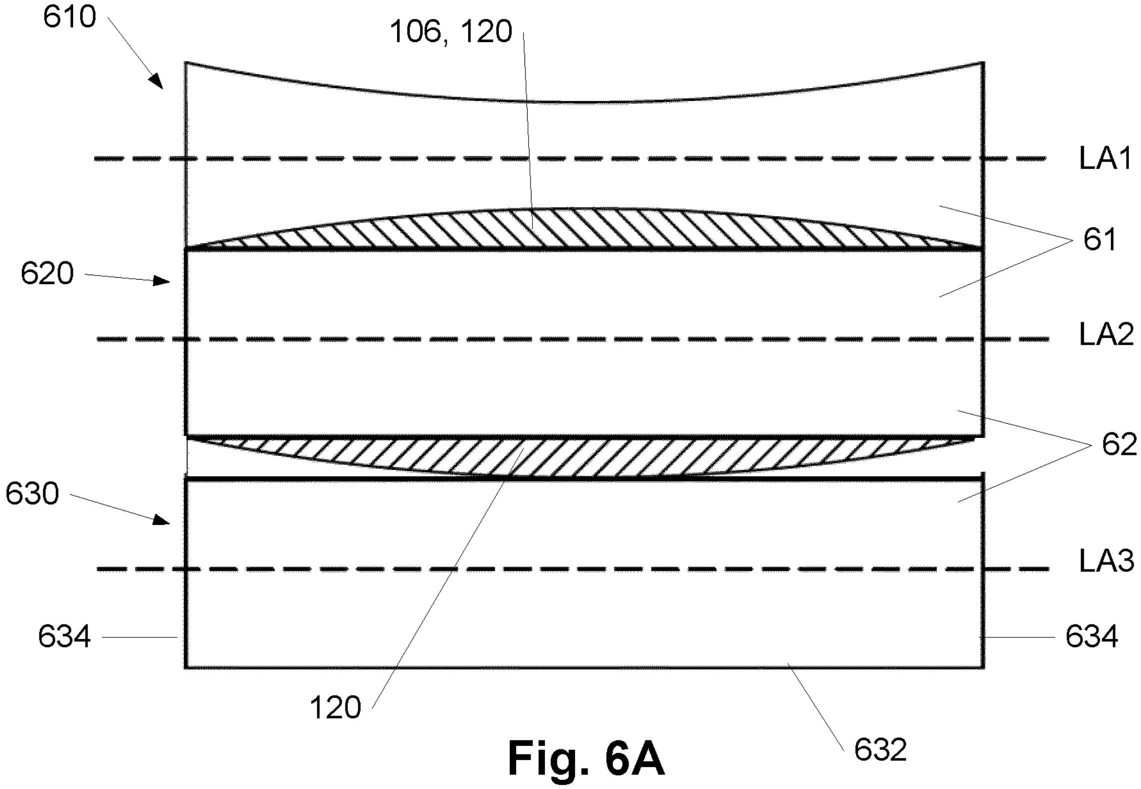
FIGS. 6A-C show three different sets of first and second pair of rollers.
Figure 6B:
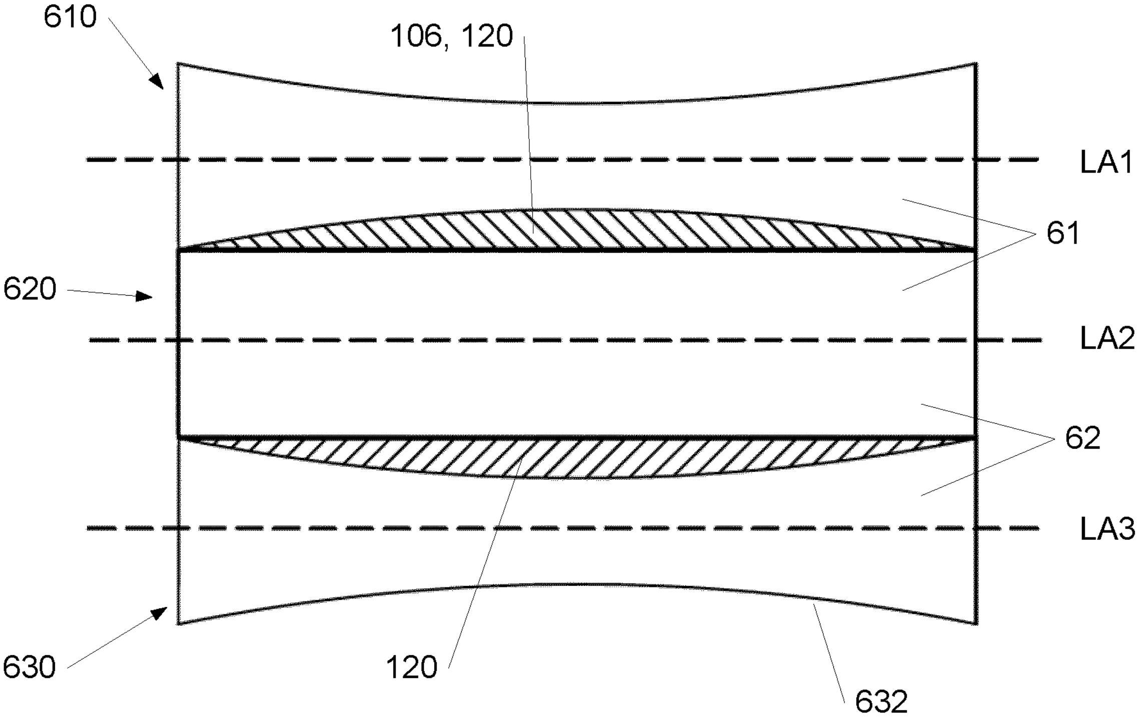
Figure 6C:
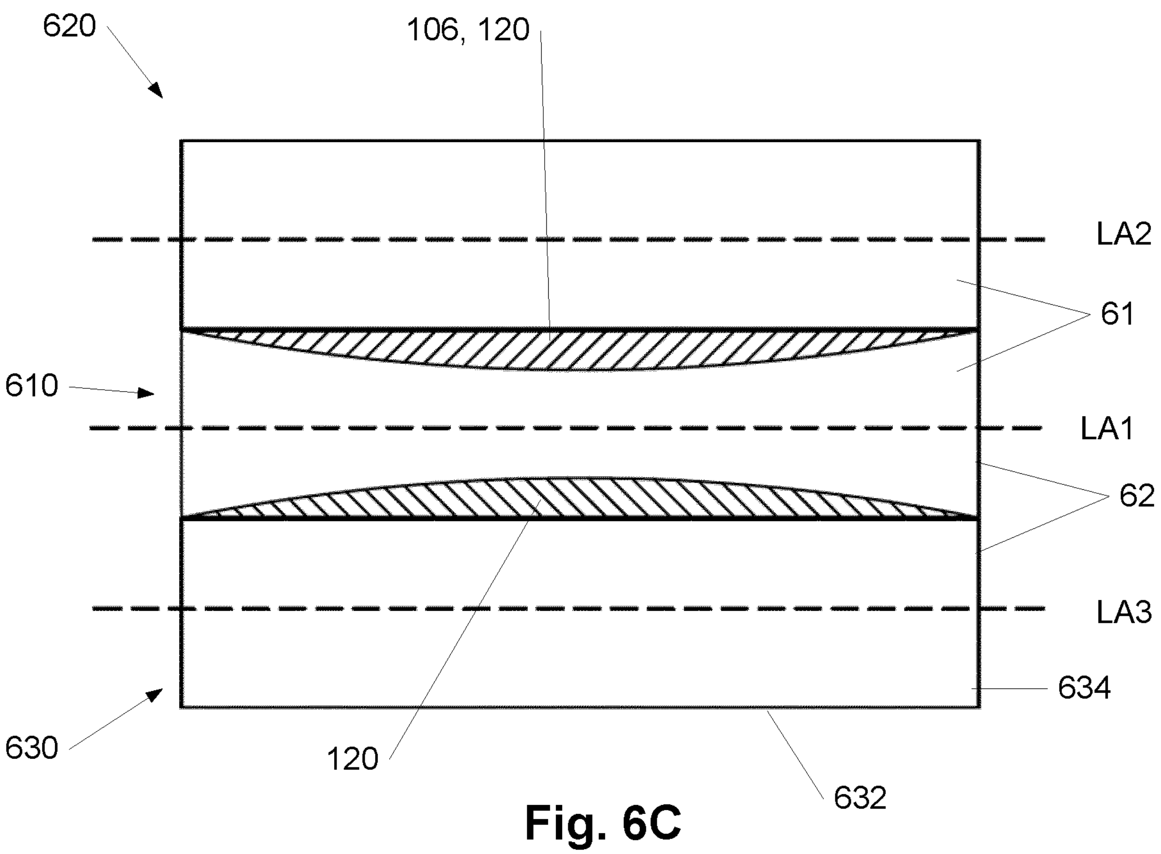

FIGS. 6A-C show three rollers 610, 620, 630 arranged as first set of rollers 61 and second set of rollers 62. The first set of rollers 61 comprises the first roller 610 and the second roller 620 as also shown in FIG. 5A. The second set of rollers 62 shown in FIGS. 6A-B comprises the second roller 620 as shown in FIG. 5A and the third roller 630. The third roller 630 includes a third shaping surface 632 extending between opposing ends 634 of the third roller 630. The second and third shaping surfaces 622, 632 are arranged opposite each other.

The third shaping surface 632 on the third roller 630 shown in FIG. 6A is extending cylindrically between the opposing ends 634. Alternatively, the third shaping surface 632 may be slightly convex. The third shaping surface 632 on the third roller 630 shown in FIG. 6B is extending concavely between opposing ends 634 of the third roller 630.

The second set of rollers 62 shown in FIG. 6C includes the first roller 610 as shown in FIG. 5A and the third roller 630. The third roller 630 includes a third shaping surface 632 extending between opposing ends 634 of the third roller 630. The first and third shaping surfaces 612, 632 are arranged opposite each other. The third shaping surface 632 on the third roller 630 shown in FIG. 6C is extending cylindrically between the opposing ends 634. Alternatively, the third shaping surface 632 may be slightly convex.

The polymer material sheet 106 is passing through the space between the first and second shaping surfaces 612, 622 as shown in FIGS. 6A-6C to obtain the polymer leading edge protection sheet 120 with chamfered side edges 122. The polymer leading edge protection sheet 120 is further passing through the space between the second and third shaping surfaces 622, 632 as also shown in FIGS. 6A-6C.

Normally, the shaping surfaces 612, 622, 632 are smooth surfaces. When applying a pressure sensitive adhesive to a leading edge protection sheet 120 after producing the same, the key is to get the contact area as high as possible. This may be achieved by having a flat surface with low roughness on the shaping surfaces 612, 622, 632 of the rollers 610, 620, 630.

Like the other rollers 610, 620, 630, the fourth roller 640 shown in FIG. 4C includes a fourth shaping surface (not shown in the figures) extending between opposing ends 644 of the fourth roller 640. The fourth shaping surface is arranged opposite the third shaping surface 632 on the third roller 630 in the example shown in FIG. 4C. The fourth shaping surface may be extending cylindrically between the opposing ends 644. Alternatively, the fourth shaping surface may be slightly convex. Yet alternatively, the fourth shaping surface may be concave. The shape of the shaping surface depends on the shape of the third shaping surface 632 which it is positioned opposite of.

FIGS. 7A-D show different examples of leading edge protection sheets 120 with chamfered side edges 122. The leading edge protection sheets 120 has a width in a width direction W between side edges 122 of the polymer leading edge protection sheet 120. The differences between the leading edge protection sheets 120 shown in FIGS. 7A-D are the thickness T of the leading edge protection sheets 120 at the chamfered side edge 122 in comparison to the thickness at the centre area 124 and the variation in the profile along the width W.

Figure 7A:
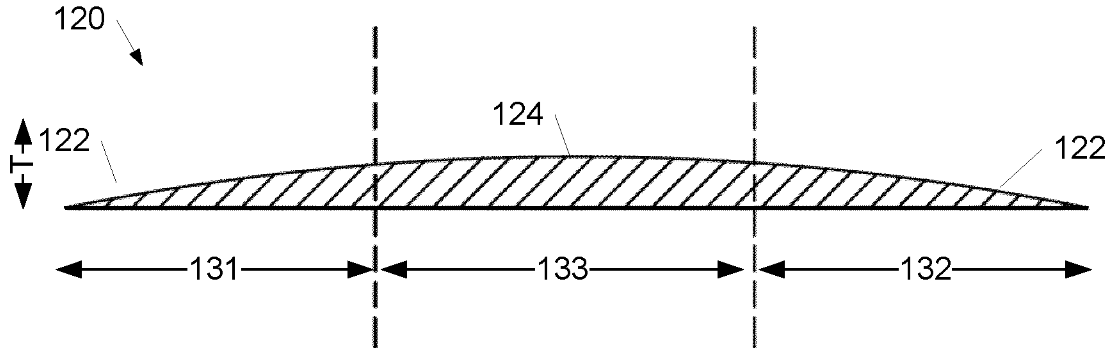
FIGS. 7A-D show different examples of leading edge protection sheets with chamfered side edges.
Figure 7B:
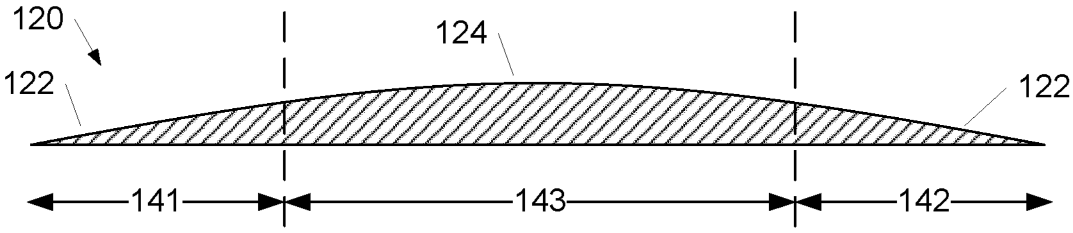
Figure 7C:
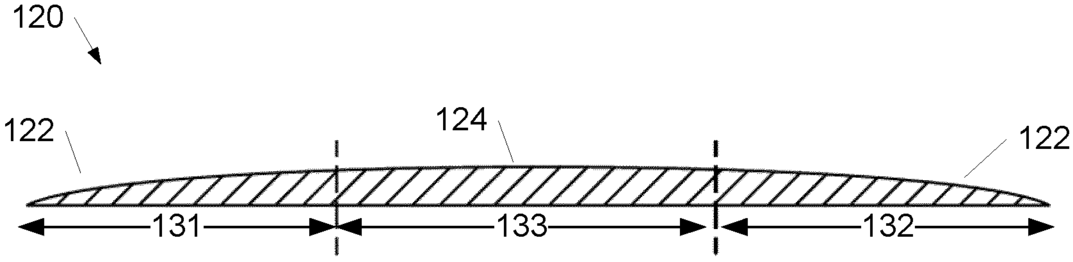
Figure 7D:
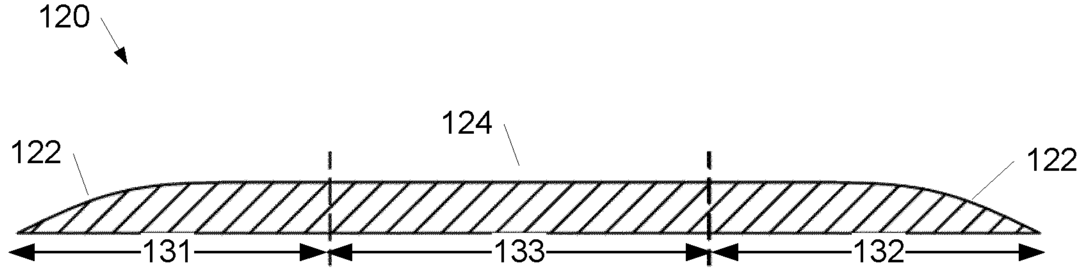

The width of the leading edge protection sheets 120 as shown in FIGS. 7A, 7C and 7D includes a first third 131 and a second third 132, wherein the first and second thirds 131, 132 are located proximate each their respective side edge 122. The remaining third 133 is arranged between the first and second thirds 131, 132. The polymer leading edge protection sheet 120 thickness variation in the width direction is larger at the first and second thirds 131, 132, i.e. at the side edge 122 than at the remaining third 133. This is most clearly seen in FIG. 7D, where the thickness variation at the third 133 is nearly zero.

The first third and the second third 131, 132 may have a minimum thickness of less than 0.5 mm, whereas the remaining third 133 may have a maximum thickness of less than 1 mm. The first third and the second third 131, 132 may have a minimum thickness of more than 0.01 mm, such as more than 0.05 mm, such as more than 0.10 mm.

The width of the leading edge protection sheets 120 as shown in FIG. 7B includes a first fourth 141 and a second fourth 142, wherein the first and second fourths 141, 142 are located proximate each their respective side edge 122. The remaining half 143 is arranged between the first and second fourth 141, 142. The polymer leading edge protection sheet 120 thickness variation in the width direction is larger at said first and second fourths 141, 142, i.e. at the side edge 122 than at the remaining half 143.

Figure 8:
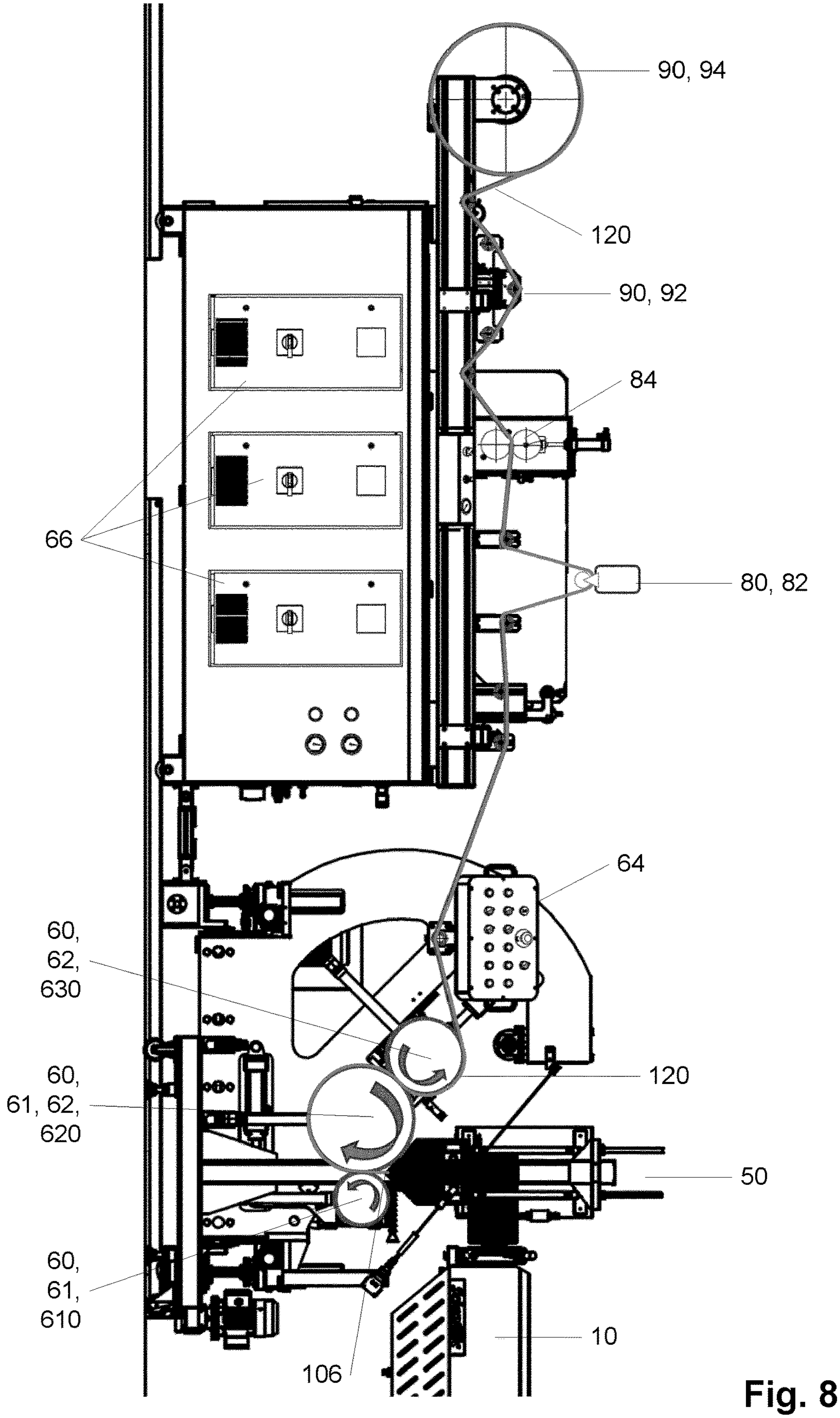
FIG. 8 shows a system for producing a polymer leading edge protection sheet with chamfered side edges.

FIG. 8 shows an alternative system for producing a polymer leading edge protection sheet 120 with chamfered side edges. The system shown in FIG. 8 includes an extrusion system 10, a flat die 50, a roller system 60, a conveyer 70, a quality control section 80, and a pull roll unit 90. The roller system 60 includes a first pair of rollers 61 comprising a first roller and a second roller 620. The roller system 60 also includes a second pair of rollers 62 comprising the second roller 620 and a third roller 630. The second pair of rollers 62 functions as cooling rollers. The second pair of rollers 62 is controlled by a control unit 64 and a cooling control unit 66 for controlling the cooling of the second pair of rollers 62. The quality control section 80 includes a thickness measuring unit 82 for measuring the thickness of the polymer leading edge protection sheet 120. The system also includes a pulling station 84 for pulling the polymer leading edge protection sheet 120 towards the pull roll unit 90. The pull roll unit 90 includes tension control unit 92 for controlling the tension of the pull roll unit 90, and a pull roller 94. The functioning of the alternative system for producing a polymer leading edge protection sheet 120 with chamfered side edges shown in FIG. 8 is the similar to the one already described in FIG. 1.

REFERENCES

10 extrusion system
20 screen system
50 flat die
60 roller system
61 first pair of rollers
62 second pair of rollers
64 control unit for the second pair of rollers
66 cooling control unit for controlling the cooling of the second pair of rollers
70 conveyer
80 quality control section
82 thickness measuring unit
84 pulling station
90 pull roll unit
92 tension control unit for controlling the tension of the pull roll unit
94 pull roller
100 granulated polymer material
102 molten polymer material
104 plasticised polymer material
106 polymer material sheet
108 first major surface
110 second major surface
120 polymer leading edge protection sheet
122 chamfered side edge
124 centre area
131 first third
132 second third
133 remaining third
141 first fourth
142 second fourth
143 remaining half
202 melting a granulated polymer material 100 in an extruder process
204 pressing the plasticised polymer material 104 through a flat die 50 to form the plasticised polymer material 104 into the polymer material sheet 106
206 step of providing and shaping the polymer material sheet 106 into a polymer leading edge protection sheet 120
208 leading the polymer leading edge protection sheet 120 through a quality control section
210 rolling the polymer leading edge protection sheet 120 onto one or more rolls
502 inlet channel
504 side surface
506 flat outlet channel
508 exiting edge of the flat outlet channel
510 electrical heater
610 first roller
612 first shaping surface
614 end of the first roller
616 middle section of the first roller

618 end section of the first roller
620 second roller
622 second shaping surface
624 end of the second roller
630 third roller
632 third shaping surface
634 end of the third roller
640 fourth roller
644 end of the fourth roller
LA1 first longitudinal axis length
LA2 second longitudinal axis length
LA3 third longitudinal axis length
W1 first width
W2 second width
RC radius for curve

The invention claimed is:

1. A process for producing a polymer leading edge protection sheet with chamfered side edges for a wind turbine blade, the process comprising:

providing a polymer material sheet comprising a first major surface and a second major surface, each of the first major surface and the second major surface comprising a width extending in a width direction between side edges of the polymer material sheet, wherein the first major surface and the second major surface surfaces are oppositely directed, wherein the polymer material sheet comprises a thickness;

shaping the polymer material sheet into a polymer leading edge protection sheet by providing the polymer material sheet between at least one pair of rollers comprising a first roller and a second roller, wherein:

the first roller comprises a first shaping surface extending between opposing ends of the first roller, wherein the first shaping surface extends concavely between said opposing ends;

the second roller comprises a second shaping surface extending between opposing ends of the second roller;

the first shaping surface and the second shaping surface are arranged opposite each other;

the thickness of the polymer material sheet is altered by the first shaping surface and the second shaping surface of the first roller and the second roller, respectively, during rotation of the first roller and the second roller to obtain the polymer leading edge protection sheet with chamfered side edges, the polymer leading edge protection sheet having a reduced thickness at the chamfered side edges when compared to a sheet thickness at a center area.

2. The process according to claim 1, wherein the process further comprises:

melting a granulated polymer material through an extruder process to obtain a molten polymer material comprising a predefined hardness hereby obtaining a plasticized polymer material; and pressing the plasticized polymer material through a flat die to form the plasticized polymer material into the polymer material sheet.

3. The process according to claim 2, wherein prior to melting the granulated polymer material, generating the granulated polymer material by providing an original granulated polymer material and drying the original granulated polymer material to a moisture level at or below 0.02 wt %.

4. The process according to claim 2, wherein the polymer material is a polyurethane material and wherein the granulated polyurethane material is an aliphatic thermoplastic polyurethane (TPU) made from a polyol, butane-diol chain extender and an aliphatic isocyanate.

5. The process according to claim 2, wherein the polymer material is a polyurethane material and wherein the granulated polyurethane material further comprises one or more additives comprising, UV-absorbers, antioxidants, and/or pigments.

6. The process according to claim 2, wherein the polymer material is a polyurethane material and wherein the granulated polyurethane material does not comprise a release agent.

7. The process according to claim 1, wherein the polymer material is a polyurethane thermoplastic material comprising a polyol, a chain extender and an aliphatic isocyanate.

8. The process according to claim 1, wherein the polymer material is a polyurethane material and wherein the polymer leading edge protection sheet is a polyurethane leading edge protection sheet.

9. The process according to claim 1, wherein the polymer leading edge protection sheet comprises the following physical properties:

a maximum thickness between 0.8 mm and 2.0 mm;

a shore A hardness between 65 and 75, measured by ISO 868;

an elongation above 400 mm when measured at 23° C. using ISO 37/1A;

a speed of sound below 1700 m/s, measured by ISO 16810 and ISO 16811; and an erosion resistance above 8 hours at 150 m/s, measured by DNV-RP-0171.

10. The process according to claim 1, wherein the polymer leading edge protection sheet comprises the following physical properties:

a maximum thickness between 0.7 mm and 2.0 mm;

a shore A hardness between 68 and 78, measured by ISO 868;

an elongation above 400 mm when measured at 23° C. using ISO 37/1A;

a speed of sound below 1700 m/s, measured by ISO 16810 and ISO 16811; and an erosion resistance above 10 hours at 140 m/s, measured by DNV-RP-0171.

11. The process according to claim 1, wherein the polymer leading edge protection sheet comprises a shore A hardness at 78 or less.

12. The process according to claim 1, wherein the polymer leading edge protection sheet comprises a shore A hardness at 75 or less.

13. The process according to claim 1, wherein the polymer leading edge protection sheet comprises a width in a width direction between the chamfered side edges of the polymer leading edge protection sheet, the width of the polymer leading edge protection sheet comprising a first third and a second third, wherein the first third and the second third thirds are located proximate each their respective side edge of the polymer leading edge protection sheet, wherein the remaining third is arranged between the first third and the second third, wherein polymer leading edge protection sheet thickness variation in the width direction is larger at the first third and the second third than at the remaining third.

14. The process according to claim 13, wherein the remaining third comprises a maximum thickness of less than 1 mm.

15. The process according to claim 13, wherein the first third and the second third comprises a minimum thickness of less than 0.5 mm.

16. The process according to claim 1, wherein the polymer leading edge protection sheet comprises a width in a width direction between side edges of the polymer leading edge protection sheet, the width of the polymer leading edge protection sheet comprising a first fourth and a second fourth, wherein the first fourth and the second fourth are located proximate each of their respective side edge of the polymer leading edge protection sheet, wherein a remaining half of the polymer leading edge protection sheet is arranged between the first fourth and the second fourth, wherein a polymer leading edge protection sheet thickness variation in the width direction is larger at the first fourth and the second fourth than at the remaining half.

17. The process according to claim 1, wherein the second shaping surface of the second roller extends cylindrically between the opposing ends.

18. The process according to claim 1, wherein the first roller and the second roller each has a longitudinal axis extending between the opposing ends, wherein the longitudinal axes of the first roller and the second roller are substantially parallel to each other.

19. The process according to claim 1, wherein the first shaping surface of the first roller is curved.

20. The process according to claim 1, wherein the second shaping surface of the second roller is smooth.

21. The process according to claim 1, wherein shaping the polymer material sheet into the polymer leading edge protection sheet is obtained by pulling and/or pushing the polymer material sheet through at least the at least one pair of rollers.

22. The process according to claim 1, wherein shaping the polymer material sheet into the polymer leading edge protection sheet is obtained by pulling the polymer material sheet through at least the at least one pair of rollers, wherein at least the first roller and/or the second roller pulls the polymer material sheet through at least the at least one pair of rollers.

23. The process according to claim 1, wherein shaping the polymer material sheet into the polymer leading edge protection sheet is obtained shaping the polymer material sheet into the polymer leading edge protection sheet is obtained by allowing the polymer material sheet to fall into a cavity between the at least one pair of rollers.

24. The process according to claim 1, wherein the process further comprises providing the polymer leading edge protection sheet between a second pair of rollers, the second pair of rollers comprising a third roller, and one of the first roller and the second roller (620).

25. The process according to claim 24, wherein the third roller comprises a third shaping surface extending between opposing ends of the third roller, wherein the third shaping surface extends concavely between the opposing ends of the third roller.

26. The process according to claim 24, wherein the third roller comprises a third shaping surface extending between the opposing ends of the third roller, wherein the third shaping surface extends cylindrically between the opposing ends of the third roller.

27. The process according to claim 24, wherein the first roller, the second roller, and/or the third roller is cooled.

28. The process according to claim 1, further comprising providing the polymer leading edge protection sheet through a quality control section, which ensures performance specifications/requirements specifications of the polymer leading edge protection sheet.

29. The process according to claim 1, further comprising rolling the polymer leading edge protection sheet onto one or more rolls prior to addition of an adhesive and/or shortening of the polymer leading edge protection sheet.

30. A polymer leading edge protection sheet comprising a polymer leading edge protection sheet, wherein the polymer leading edge protection sheet is formed by a process comprising:

- providing a polymer material sheet comprising a first major surface and a second major surface, each of the first major surface and the second major surface comprising a width extending in a width direction between side edges of the polymer material sheet, wherein the first major surface and the second major surface surfaces are oppositely directed, wherein the polymer material sheet comprises a thickness;
- shaping the polymer material sheet into a polymer leading edge protection sheet by providing the polymer material sheet between at least one pair of rollers comprising a first roller and a second roller, wherein:
  - the first roller comprises a first shaping surface extending between opposing ends of the first roller, wherein the first shaping surface extends concavely between said opposing ends;
  - the second roller comprises a second shaping surface extending between opposing ends of the second roller;
  - the first shaping surface and the second shaping surface are arranged opposite each other;
  - the thickness of the polymer material sheet is altered by the first shaping surface and the second shaping surface of the first roller and the second roller, respectively, during rotation of the first roller and the second roller to obtain the polymer leading edge protection sheet with chamfered side edges, the polymer leading edge protection sheet having a reduced thickness at the chamfered side edges when compared to a sheet thickness at a center area.

31. A wind turbine blade system comprising:

- a wind turbine blade; and
- a polymer leading edge protection sheet applied to the wind turbine blade wherein the polymer leading edge protection sheet comprises a polymer leading edge protection sheet, wherein the polymer leading edge protection sheet is formed by a process comprising:
  - providing a polymer material sheet comprising a first major surface and a second major surface, each of the first major surface and the second major surface comprising a width extending in a width direction between side edges of the polymer material sheet, wherein the first major surface and the second major surface surfaces are oppositely directed, wherein the polymer material sheet comprises a thickness;
  - shaping the polymer material sheet into a polymer leading edge protection sheet by providing the polymer material sheet between at least one pair of rollers comprising a first roller and a second roller, wherein:
    - the first roller comprises a first shaping surface extending between opposing ends of the first roller, wherein the first shaping surface extends concavely between said opposing ends;
    - the second roller comprises a second shaping surface extending between opposing ends of the second roller;
    - the first shaping surface and the second shaping surface are arranged opposite each other;
    - the thickness of the polymer material sheet is altered by the first shaping surface and the second shaping surface of the first roller and the second roller, respectively, during rotation of the first roller and the second roller to obtain the polymer leading edge protection sheet with chamfered side edges, the polymer leading edge protection sheet having a reduced thickness at the chamfered side edges when compared to a sheet thickness at a center area.

* * * * *